US012688772B2

(12) United States Patent
Kitaoka

(10) Patent No.: US 12,688,772 B2
(45) Date of Patent: Jul. 21, 2026

(54) INFORMATION PROCESSING DEVICE

(71) Applicant: TOYOTA JIDOSHA KABUSHIKI KAISHA, Aichi-ken (JP)

(72) Inventor: Hironobu Kitaoka, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 27 days.

(21) Appl. No.: 18/801,864

(22) Filed: Aug. 13, 2024

(65) Prior Publication Data

US 2025/0104553 A1 Mar. 27, 2025

(30) Foreign Application Priority Data

Sep. 27, 2023 (JP) ................................. 2023-164240

(51) Int. Cl.

| | |
|---|---|
| ***G08G 1/00*** | (2006.01) |
| ***G08G 1/01*** | (2006.01) |
| ***G08G 1/052*** | (2006.01) |

(52) U.S. Cl.

CPC ......... *G08G 1/0133* (2013.01); *G08G 1/0112* (2013.01); *G08G 1/0145* (2013.01); *G08G 1/052* (2013.01)

(58) Field of Classification Search

CPC .. G08G 1/0133; G08G 1/0112; G08G 1/0145; G08G 1/052; G08G 1/0116; G08G 1/0129; G08G 1/065

See application file for complete search history.

(56) References Cited

U.S. PATENT DOCUMENTS 6,317,686 B1 * 11/2001 Ran ...................... G08G 1/0141 73/178 R

2013/0138320 A1 * 5/2013 Aso .................. G08G 1/096741 701/96

(Continued)

FOREIGN PATENT DOCUMENTS

JP H07262487 A * 10/1995 ............. G01C 21/00

JP H10124791 A * 5/1998 ............... G08G 1/00

(Continued)

OTHER PUBLICATIONS

Aljamal, Mohammad A., Mohamed Farag, and Hesham A. Rakha. "Developing data-driven approaches for traffic density estimation using connected vehicle data." IEEE Access 8 (2020): 219622-219631. (Year: 2020).*

*Primary Examiner* — Russell Frejd
*Assistant Examiner* — Brittany Renee Peko
(74) *Attorney, Agent, or Firm* — HAUPTMAN HAM, LLP

(57) ABSTRACT

An information processing device for calculating a travel time that is a time from a predetermined point to arrival at a target point by a vehicle traveling on a road, the information processing device comprising: a control unit configured to estimate a traffic flow rate that is a number of vehicles passing through the target point within a predetermined unit time; estimate a first traffic amount that is a number of vehicles in a first section that is a section of a road from the predetermined point to the target point based on a vehicle density that is a density of the vehicle existing in the first section calculated from the travel information acquired from the vehicle traveling in the first section; and calculate a first travel time that is a travel time in the first section based on the traffic flow rate and the first traffic amount.

4 Claims, 5 Drawing Sheets

(56) References Cited

U.S. PATENT DOCUMENTS

| | | | | |
|---|---|---|---|---|
| 2018/0089992 | A1* | 3/2018 | Ooba | G08G 1/0112 |
| 2019/0311615 | A1* | 10/2019 | Ashida | G08G 1/0141 |
| 2020/0284594 | A1* | 9/2020 | Wang | G08G 1/0112 |
| 2021/0295705 | A1* | 9/2021 | Yang | G01C 21/3407 |
| 2023/0316905 | A1* | 10/2023 | Yoshioka | G08G 1/052<br>701/119 |
| 2023/0326334 | A1* | 10/2023 | Zhang | G08G 1/0962<br>340/934 |

FOREIGN PATENT DOCUMENTS

| | | | | | |
|---|---|---|---|---|---|
| JP | H1139587 | A | * | 2/1999 | B65G 61/00 |
| JP | 2005-149052 | A | | 6/2005 | |
| JP | 2016009322 | A | * | 1/2016 | G08G 1/00 |
| JP | 2017-049951 | A | | 3/2017 | |
| JP | 2021-071995 | A | | 5/2021 | |
| JP | 2021-184172 | A | | 12/2021 | |
| KR | 20100034839 | A | * | 4/2010 | G08G 1/065 |

* cited by examiner

INFORMATION PROCESSING DEVICE

CROSS-REFERENCE TO RELATED APPLICATION

This application claims priority to Japanese Patent Application No. 2023-164240 filed on Sep. 27, 2023, incorporated herein by reference in its entirety.

BACKGROUND

1. Technical Field

The present disclosure relates to calculation of a travel period.

2. Description of Related Art

Numerous technologies for predicting traffic conditions are known. For example, Japanese Unexamined Patent Application Publication No. 2021-71995 (JP 2021-71995 A) discloses a traffic condition prediction system that predicts a traffic condition of a road based on a reference cumulative traffic amount predicted value at a most upstream reference point of a prediction target range and a most downstream pseudo cumulative traffic amount predicted value at a most downstream point of the prediction target range. JP 2021-71995 A discloses that the prediction target range is a range predicted based on a traffic condition estimation result and a vehicle inflow amount prediction result.

SUMMARY

An object of the present disclosure is to perform prediction with higher accuracy than that in related art in calculation of a travel period on a road.

An aspect of an embodiment of the present disclosure provides an information processing device configured to calculate a travel period from a predetermined point to a target point. The information processing device includes a control unit configured to:

- estimate a traffic flow rate that is the number of vehicles passing through the target point within a predetermined unit period;
- estimate a first traffic amount that is the number of vehicles in a first section based on a vehicle density that is a density of vehicles present in the first section, the first section being a section of a road from the predetermined point to the target point, and the vehicle density being calculated based on travel information acquired from the vehicles traveling in the first section; and
- calculate a first travel period that is the travel period in the first section based on the traffic flow rate and the first traffic amount.

Examples of other aspects include a method to be executed by the device, a program that causes a computer to execute the method, and a computer-readable storage medium that non-transitorily stores the program.

According to the present disclosure, it is possible to perform the prediction with higher accuracy than that in the related art in the prediction of the traffic condition of the road.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
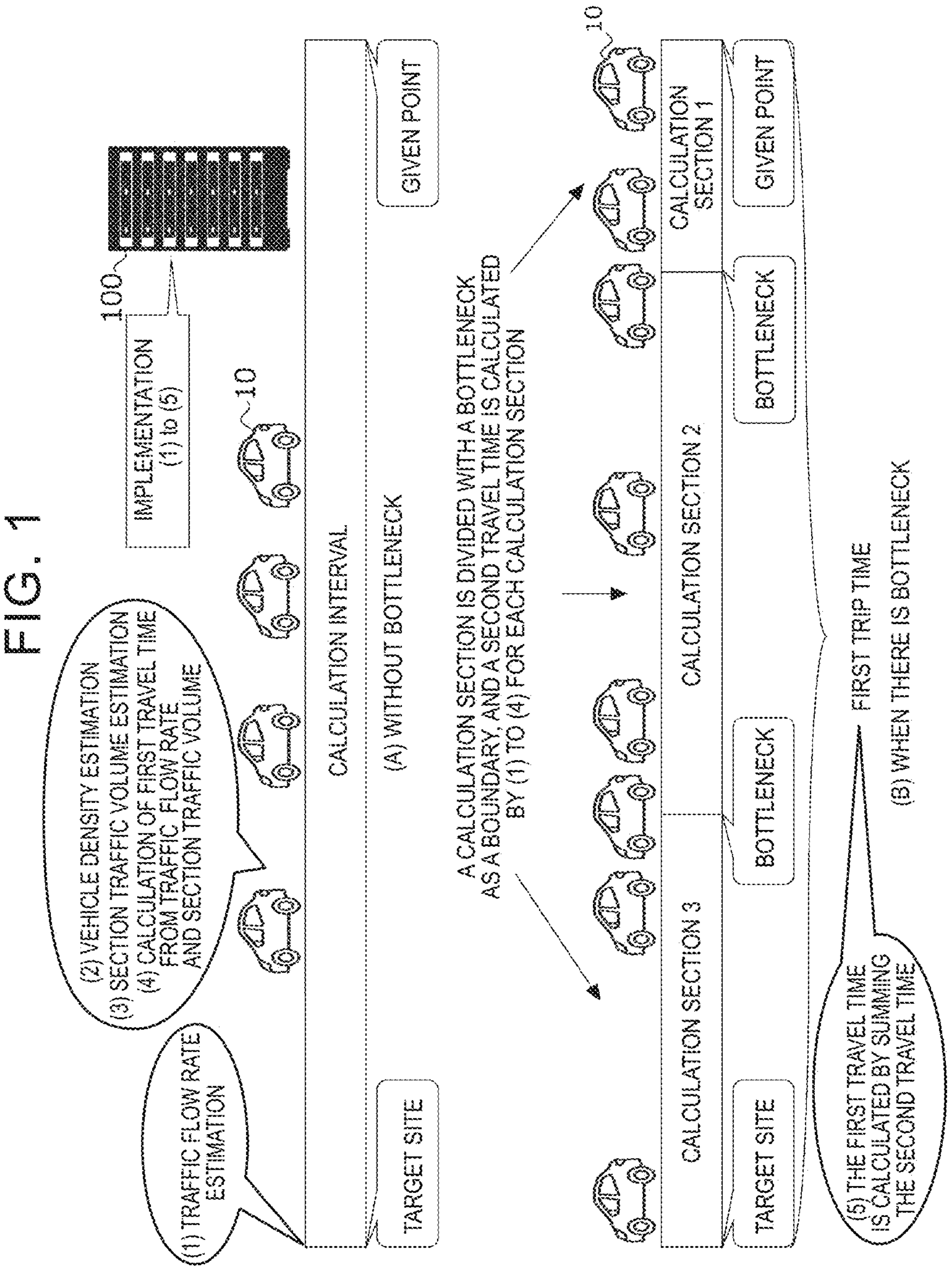
FIG. 1 is a diagram illustrating an outline of processing executed by a server device according to an embodiment.

Systems for predicting traffic conditions are known.

For example, consider a system for predicting travel time, which is the time taken for a vehicle to travel on a road from a predetermined point to a target point. First, the system acquires data detected by a roadside device such as a vehicle sensor installed on a road and probe data from a plurality of vehicles traveling on the road. Then, the system predicts the travel time by calculating the traffic flow rate (the traffic amount per unit time) and the like using both acquired data. At this time, the system mainly uses data detected by a vehicle sensor or the like to predict a traffic flow rate.

However, a vehicle sensor or the like is not necessarily installed at a point where a traffic condition different from a steady state occurs, such as an accident occurrence point or a restriction target point. In addition, since a vehicle sensor or the like cannot be densely installed, such as at intervals of several km, from the viewpoint of installation cost, it is difficult for the system using data detected by the vehicle sensor or the like to accurately detect a traffic condition that differs from a traffic jam or a steady state.

In order to deal with such a problem, it is preferable that the system does not use data detected by a vehicle sensor or the like for detecting a traffic situation different from a traffic jam or a steady state and predicting a traffic flow rate, a travel time, or the like.

The information processing device according to the present embodiment solves such a problem.

An information processing device according to the one aspect of the present disclosure includes a control unit configured to:

An information processing device for calculating a travel time from a predetermined point to a target point, comprising: estimating a traffic flow rate, which is the number of vehicles passing through the target point, within a predetermined unit time; estimating a first traffic amount, which is the number of vehicles in a first section, which is a section of a road from the predetermined point to the target point, based on a vehicle density, which is a density of vehicles existing in the first section, calculated from travel information acquired from vehicles traveling in the first section; and calculating a first travel time, which is the travel time in the first section, based on the traffic flow rate and the first traffic amount.

The target point is an end portion of a section for calculating the first travel time. The target point may typically be a destination of the vehicle.

The traffic flow rate is obtained by converting the traffic volume (the number of vehicles that have passed) measured at a predetermined point into the traffic volume per unit time (typically one hour).

For example, in a case where there is a portion where a traffic jam occurs due to a bottleneck or the like, the traffic flow rate at the portion may be significantly lower than the traffic flow rate at a normal time. The traffic flow rate may vary depending on the location of the bottleneck, the cause of the traffic jam, and the like.

For example, the control unit may estimate the traffic flow rate of the target point based on the probe information transmitted from the vehicle, or may hold and use the actual value of the traffic flow rate for each target point.

The first section is a section from a predetermined point to a target point. The first section is a section that is a target for calculating the first travel time.

The first traffic volume is the number of vehicles present in the first section.

The traveling information is information indicating a speed, a traveling direction, and the like of the vehicle acquired from the vehicle traveling on the road. The travel information may be probe information collected from a vehicle traveling in the first section.

The vehicle density represents a traffic congestion degree, and is expressed by the number of vehicles present per unit distance (for example, 1 km).

The control unit estimates the first traffic amount (traffic amount from the target point to the predetermined point) based on the vehicle density calculated from the travel information acquired from the vehicle traveling in the first section. Since there is a constant correlation between the speed of the vehicle and the vehicle density, when the traveling information includes speed information or the like, the vehicle density of the vehicle traveling in the first section can be estimated by a known method. When the vehicle density is known, the first traffic amount can be estimated by multiplying the length of the first section.

Then, the control unit calculates the first travel time using both the traffic flow rate corresponding to the target point and the estimated first traffic amount. If the traffic flow rate at the head of the first section and the traffic volume in the first section are known, the time taken to pass through the first section can be determined.

Thus, the information processing device according to the present disclosure can calculate the travel time with higher accuracy than the conventional one without using the data acquired by the vehicle sensor or the like.

Further, the control unit may set a plurality of calculation sections by dividing the first section with the bottleneck point as a boundary when there is a bottleneck point that is a cause of traffic jam in the road. The control unit may estimate the second traffic amount, which is the number of vehicles present in the calculation section, by multiplying the vehicle density calculated for each calculation section by the section length of the calculation section for each of the plurality of calculation sections. The control unit may calculate, for each of the plurality of calculation sections, a second travel time, which is the travel time from the front end to the end of the calculation section in each of the calculation sections, from the second traffic volume and the traffic flow rate at the bottleneck point. The control unit may calculate the first travel time by summing the second travel times of all the calculation sections.

If there is a bottleneck on the route of the vehicle, the traffic situation may change around the bottleneck. Therefore, in such a case, the first section may be divided around the bottleneck, the travel time may be calculated for each of the plurality of divided sections, and the calculated travel time may be summed.

The second traffic amount may be the number of vehicles present in each calculation section.

The second travel time may be a time required for the vehicle to move from the front end to the end of each calculation section in each calculation section.

Thus, the information processing device according to the present disclosure can calculate the travel time based on the traffic flow rate of each section with the bottleneck point as a boundary, and can calculate the travel time based on the actual condition by summing the travel time.

The control unit may determine the vehicle density based on the traveling speed of the vehicle acquired by the vehicle traveling in the first section.

Since there is a constant correlation between the vehicle speed and the vehicle density, the vehicle density can be obtained by utilizing the speed information included in the probe information acquired by the vehicle.

Further, the control unit may acquire, as the travel information, speeds of a plurality of vehicles at the bottleneck point. The control unit may estimate the traffic flow rate at the bottleneck point based on the vehicle density at the bottleneck point and an average speed of a plurality of vehicles at the bottleneck point.

The average speed of the plurality of vehicles can be obtained from the travel information acquired from the vehicle. Further, as described above, the vehicle density can be estimated from the speed of the vehicle. Therefore, by using these pieces of information, the traffic flow rate at the bottleneck point can be estimated.

Further, the control unit may acquire an inflow traffic amount from an interchange or a junction on the road and an outflow traffic amount from the interchange or the junction on the road. The control unit may correct the first traffic amount based on the inflow traffic amount and the outflow traffic amount.

When there is an interchange or a junction in the first section, inflow or outflow occurs at a waypoint, and thus the first traffic amount in the first section may not be correctly estimated. In order to cope with this, the first traffic amount may be corrected based on the inflow traffic amount and the outflow traffic amount. As a result, it is possible to improve the calculation accuracy of the travel time.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

EMBODIMENT

An outline of processing performed by the server device according to the embodiment will be described with reference to FIG. 1. FIG. 1 is a diagram illustrating an outline of processing executed by a server device 100 according to an embodiment. Here, the server device 100 is an example of an information processing device according to the present disclosure. The server device 100 is a device that estimates a traffic state of a road on the basis of travel information or the like acquired from the vehicle 10, and calculates a travel time that is a time required for the vehicle 10 to travel from a predetermined point to a target point. The server device 100 is configured to be able to communicate with a plurality of vehicles 10.

First, the server device 100 acquires travel information of the vehicle 10. The travel information of the vehicle 10 is probe information including the speed of the vehicle 10 and the like.

First, a case where a bottleneck point is not included between a predetermined point and a target point will be described. As illustrated in (A) of FIG. 1, the server device 100 estimates the traffic flow rate of the target point ((1) of FIG. 1). Here, the traffic flow rate is the amount of traffic passing per hour (the number of vehicles) at the target point.

Next, the server device 100 estimates the vehicle density in the section from the predetermined point to the target point ((2) in FIG. 1). The vehicle density is a numerical value indicating the degree of congestion of the road, and may be expressed by the number of vehicles 10 present per 1 km. The server device 100 acquires the speed of the vehicle 10 as travel information from the vehicle 10, and estimates the vehicle density based on the speeds of the plurality of vehicles 10.

Since there is a constant correlation between the vehicle speed and the vehicle density, by using the speed of the vehicle traveling in the target section, it is possible to estimate the vehicle density in the section.

Then, the server device 100 estimates a section traffic amount that is the traffic amount in the section from the predetermined point to the target point based on the estimated vehicle density. The section traffic amount can be obtained by multiplying the estimated vehicle density by the length of the target section.

Subsequently, the server device 100 calculates the first travel time, which is the time required to move from the predetermined point to the target point, based on the traffic flow rate at the target point and the section traffic amount in the section from the predetermined point to the target point ((4) in FIG. 1).

Next, a case where a bottleneck point is included between a predetermined point and a target point will be described. As illustrated in (B) of FIG. 1, the server device 100 identifies a bottleneck point, which is a point at which traffic stays between a predetermined point and a target point from the speeds of the plurality of vehicles 10. Then, the server device 100 divides the distance from the predetermined point to the target point with the bottleneck point as a boundary, and sets each of them as a calculation section.

Next, the server device 100 estimates the traffic flow rate at the bottleneck point, which is the end portion of the calculation section.

Subsequently, the server device 100 estimates the vehicle density in each calculation section for each calculation section.

Then, the server device 100 estimates, for each calculation section, the section traffic amount which is the traffic amount in each calculation section, based on the estimated vehicle density. The section traffic amount can be obtained by multiplying the estimated vehicle density by the length of the calculation section.

Subsequently, the server device 100 calculates the second travel time, which is the time required to move from the end portion to the end portion of each calculation section, based on the traffic flow rate at each bottleneck point and the section traffic amount in the calculation section corresponding to each bottleneck point.

Finally, the server device 100 sums the second travel time for each calculation section, and calculates the first travel time, which is the time required to move from the predetermined point to the target point ((5) in FIG. 1).

As described above, the server device 100 sets the calculation section and estimates the traffic flow rate at the end of the calculation section. Then, the server device 100 estimates the traffic amount in the calculation section, and calculates the travel time corresponding to the calculation section from the estimated traffic amount and the traffic flow rate at the end.

When there is a bottleneck point on the route, the server device 100 sets a plurality of calculation sections with the bottleneck as a boundary, calculates a travel time for each calculation section, and sums the calculation sections. Accordingly, the server device 100 can predict the traffic situation based only on the travel information of the vehicle 10 without using the data detected by the roadside device such as the vehicle sensor.

According to this configuration, it is possible to appropriately calculate the travel time without using the roadside device.

Figure 2:
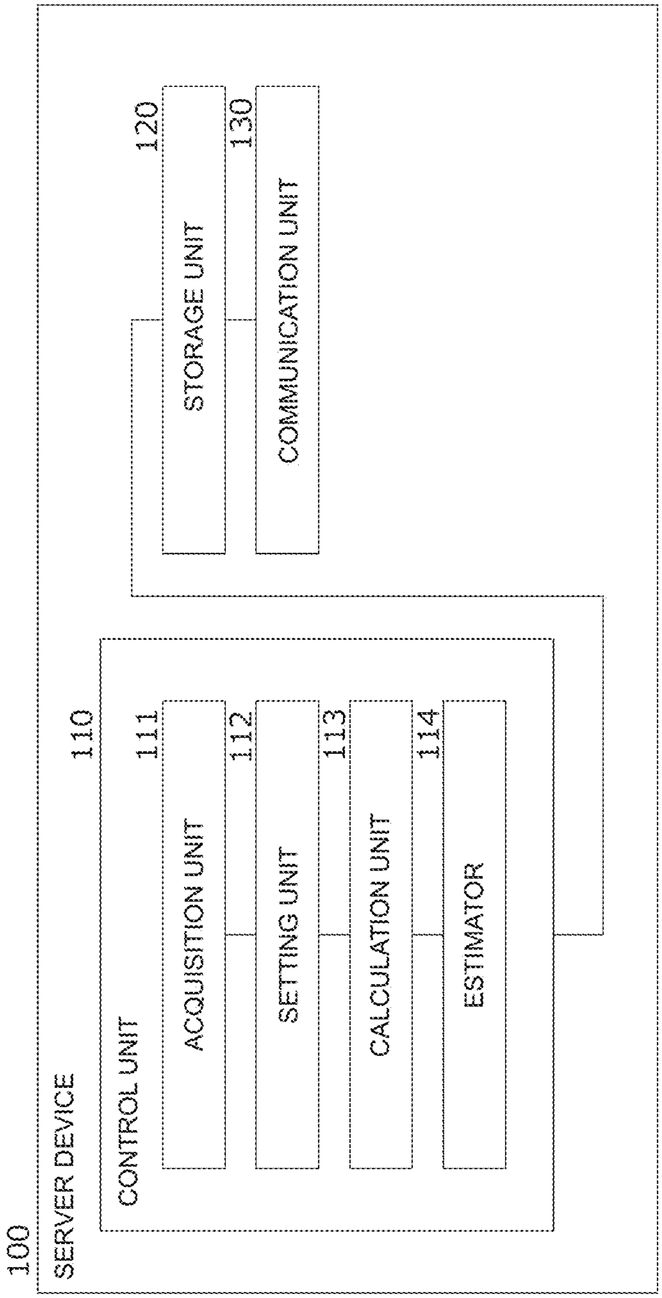
FIG. 2 is a diagram illustrating components included in the server device according to the embodiment.

Next, each element constituting the server device 100 will be described in detail. FIG. 2 is a diagram for describing components included in the server device 100 according to the embodiment.

The server device 100 according to the present embodiment includes a control unit 110, a storage unit 120, and a communication unit 130.

The control unit 110 is implemented by a processor such as a CPU (Central Processing Unit) or a GPU (Graphics Processing Unit) and a memory. The control unit 110 includes an acquisition unit 111, a setting unit 112, a calculation unit 113, and an estimation unit 114 as functional modules. These functional modules may be realized by executing a program by the control unit 110.

The acquisition unit 111 acquires travel information and the like from the vehicle 10. The travel information includes probe information of the vehicle 10 including a speed, a traveling direction, and the like of the vehicle 10.

When a bottleneck point, which is a point at which the vehicle 10 is congested, exists on the road of the calculation target section of the first travel time, the setting unit 112 divides the first section with the bottleneck point as a boundary and sets a plurality of calculation sections. When the bottleneck point does not exist in the road of the calculation target section, the first section is not divided.

The calculation unit 113 calculates the first travel time, which is the travel time in the first section, based on the traffic flow rate and the section traffic volume estimated by the estimation unit 114. Here, the first travel time is a time required for the vehicle 10 to move from the predetermined point to the target point. Note that the section traffic amount in a case where there is no bottleneck in the calculation target section and the calculation target section is not divided is the first traffic amount. In addition, in a case where there is a bottleneck in the calculation target section and the calculation target section is divided, the section traffic amount is the second traffic amount.

When the bottleneck point is present and the first section is divided, the calculation unit 113 calculates the second travel time from the section traffic amount estimated by the estimation unit 114 and the traffic flow rate at the bottleneck point for each of the plurality of calculation sections. Here, the second travel time is the travel time from the tip of the calculation section to the end of the calculation section in each calculation section divided around the bottleneck. Then, the calculation unit 113 calculates the first travel time by summing the second travel times for all the calculation sections.

The estimation unit 114 estimates the traffic flow rate at the target point or the bottleneck point determined by the setting unit 112. Here, the traffic flow rate is the number of vehicles 10 passing through the target point or the bottleneck point within a predetermined unit time. For example, the traffic flow rate may be a predetermined value determined for each point, or may be obtained by calculation. Specifically, the estimation unit 114 may estimate the traffic flow rate at the target point or the bottleneck point based on the vehicle density and the average speed of the plurality of vehicles 10 at the point. The vehicle density may be a density at a target point or a bottleneck point estimated from the speed of the vehicle 10.

Further, the estimation unit 114 estimates the traffic volume (section traffic volume) in the first section composed of the calculation section or the plurality of calculation sections. The estimation unit 114 may calculate, based on the vehicle density, the number of vehicles 10 that have passed through a predetermined point in the first section, which is the section of the road from the predetermined point to the target point, as the section traffic amount. Here, the vehicle density is the density of the vehicle existing in the first section calculated from the travel information acquired from the vehicle 10 traveling in the first section. The estimation unit 114 may determine the vehicle density based on the traveling speed of the vehicle 10 acquired by the vehicle 10.

Further, the estimation unit 114 may calculate the number of vehicles 10 included in the calculation section set by dividing the first section with the bottleneck point as the boundary as the section traffic amount. Here, the section traffic volume is a specific example of the second traffic volume.

The storage unit 120 is an auxiliary storage device such as a main storage device such as a RAM or a ROM, an EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 120 stores data or the like used or generated in processing performed by the control unit 110. Further, the storage unit 120 may temporarily store the vehicle information acquired from the vehicle 10, or the inflow traffic amount and the outflow traffic amount from the interchange or the junction on the road including the section of the calculation target of the first travel time acquired from the external server device.

The communication unit 130 includes a communication circuit that performs wireless communication. The communication unit 130 may be, for example, a communication circuit that performs wireless communication using 4G (4th Generation) or a communication circuit that performs wireless communication using 5G (5th Generation). The communication unit 130 may be a communication circuit that performs radio communication using LTE (Long Term Evolution) or a communication circuit that performs communication using LPWA (Low Power Wide Area). Further, the communication unit 130 may be a communication circuit that performs radio communication using Wi-Fi (registered trademark).

Figure 3:
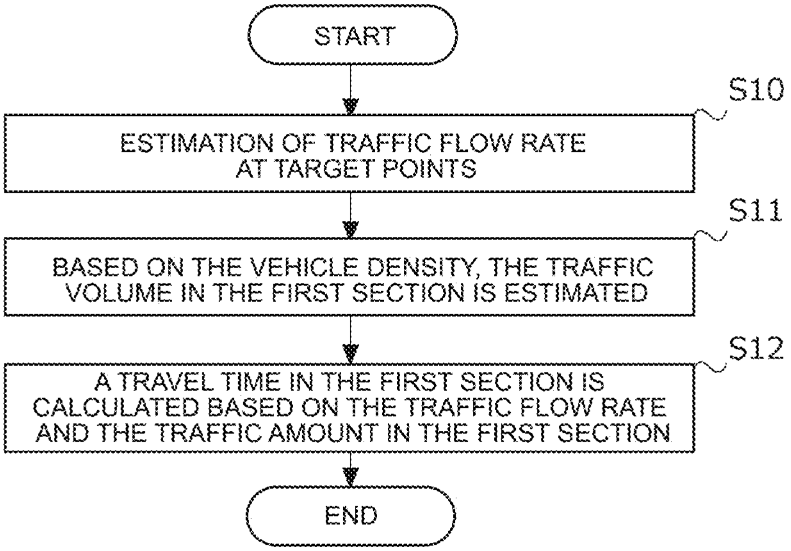
FIG. 3 is a flowchart of processing executed by a control unit of the server device according to the embodiment.

Next, specific contents of the processing performed by the server device 100 will be described. FIG. 3 is a flowchart of processing executed by the control unit 110 of the server device 100 according to the embodiment. When there is no bottleneck point on the road including the section for which the first travel time is to be calculated, the server device 100 performs the following processing on the entire section for which the first travel time is to be calculated.

Note that the server device 100 may start the processing illustrated in FIG. 3 when a trigger such as a request for providing information regarding travel time is received from a user of the vehicle 10.

First, in S10, the estimation unit 114 estimates the traffic flow rate of the target point that is the end portion of the section to be calculated for the first travel period. The estimation unit 114 may estimate the traffic flow rate at the target point based on the vehicle density at the target point and the speeds of the plurality of vehicles 10 at the target point. The estimation unit 114 may obtain the vehicle density from the average speeds of the plurality of vehicles 10 that have passed through the target point acquired by the acquisition unit 111.

$$Q = KV \qquad \text{Equation (1)}$$

Q: Traffic flow rate (traffic volume), K: vehicle density, V: average speed

Here, the mean velocity may be expressed by the following equation (Underwood equation).

$$V = Vf \cdot e^{-(K/Kc)} \qquad \text{Equation (2)}$$

V: Mean velocity, Vf: maximum velocity, K: vehicle density, Kc: critical density From Equation (2), the value of the vehicle density K can be obtained, and thereby the traffic flow rate Q can be obtained from Equation (1).

Figure 5:
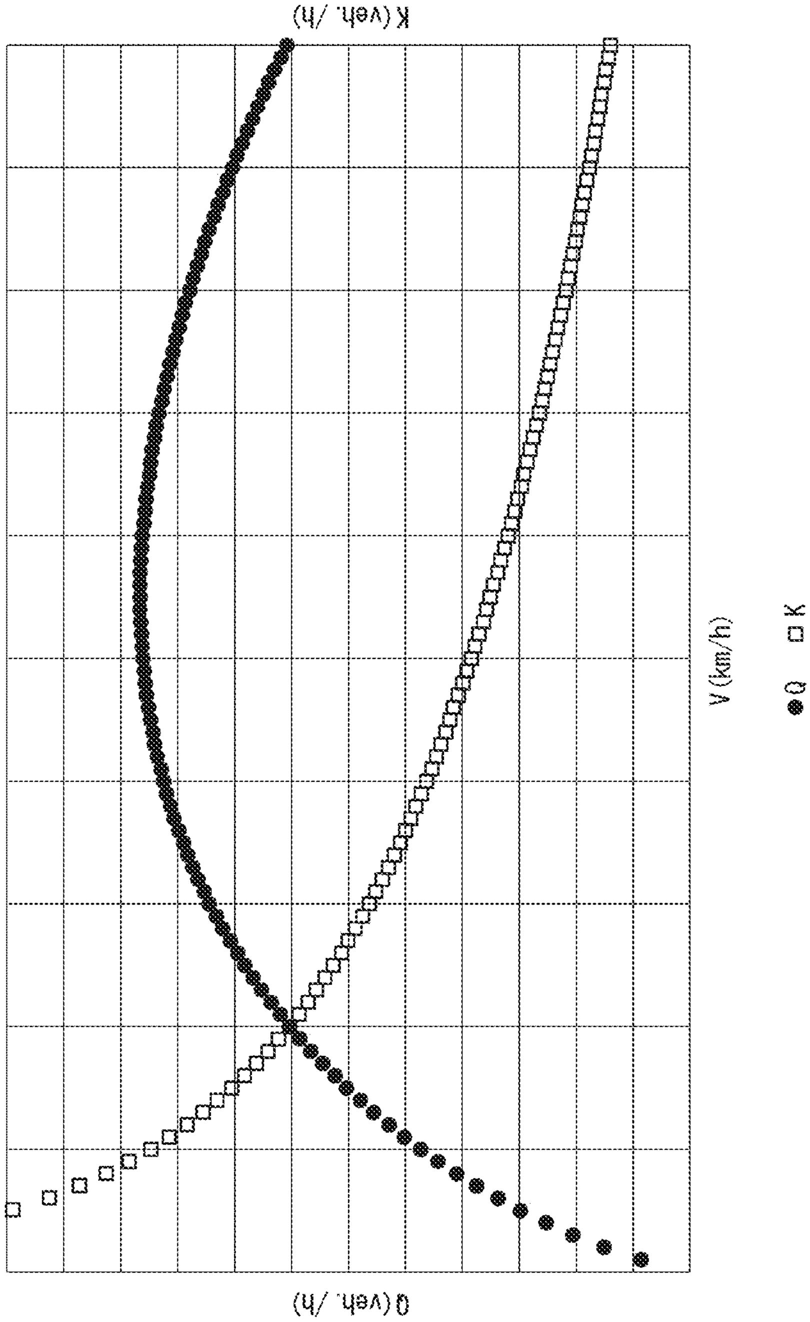
FIG. 5 is a diagram showing a relation between a velocity of a vehicle, a vehicle density, and a traffic flow rate.

The relationship between the average speed V and the vehicle density K in Equation (2) and the traffic flow rate (traffic volume) Q is shown in FIG. 5. FIG. 5 is a diagram illustrating a relationship between a speed, a vehicle density, and a traffic flow rate of a vehicle. The traffic flow rate (traffic volume) Q increases with an increase in the average speed V, but decreases when the speed exceeds the maximum value. On the road, when the speed of the vehicle 10 is a speed lower than the speed at which the traffic amount becomes the maximum value, the speed becomes a congested flow, and when the speed is a high speed, the speed becomes a free flow. As described above, when it is determined from the speed of the vehicle 10 that the traffic is congested, the traffic amount determined from the constraints on the road is treated as the traffic flow rate.

The estimation unit 114 may reflect the past statistical information of the travel information acquired from the vehicle 10 in the estimation of the traffic flow rate Q.

Further, the acquisition unit 111 may acquire, as the vehicle information acquired from the vehicle 10, information related to a winker operation, information related to a steering amount, an image by an in-vehicle camera, and the like. Then, the estimation unit 114 may identify the traveling position of the vehicle 10 and determine the traveling lane in which the vehicle 10 is traveling based on the information on the winker operation, the information on the steering amount, the image by the in-vehicle camera, and the like. Then, the estimation unit 114 may estimate the traffic flow rate for each lane, and may use a value obtained by summing the traffic flow rates for each lane as the traffic flow rate at the target point.

Next, in S11, the estimation unit 114 estimates the traffic volume in the first section based on the vehicle density in the first section. The traffic volume in the first section is a specific example of the first traffic volume.

For example, the traffic amount existing in the first section may be a value obtained by multiplying the vehicle density obtained from the average speeds of the plurality of vehicles 10 in the first section by the section length of the first section. The vehicle density may be determined based on a distance from the front vehicle or the rear vehicle sensed by the vehicle 10.

Further, the estimation unit 114 may derive a sampling ratio with respect to the traffic amount for each day of the week or each time zone at a predetermined point in the first section, based on the statistical information of the number of vehicles 10. The estimation unit 114 may estimate the traffic amount in the first section from the current number of vehicles 10 at a predetermined point in the first section.

Next, in S12, the calculation unit 113 calculates travel times in the first section on the basis of the traffic flow rate at the target point and the traffic volume in the first section. The travel time in the first section is a time required for the vehicle 10 to move from the front end to the end of the first section. The calculation unit 113 may use a value obtained by dividing the traffic volume in the first section by the traffic flow rate at the target point as the travel time in the first section. The travel time in the first section is a specific example of the first travel time.

After S12, the estimation unit 114 may compare the travel time in the first section calculated by S12 with the travel time in the first section of the actual vehicle 10. Then, the estimation unit 114 may determine parameters such as the maximum velocity Vf and the critical density Kc in Equation (2) such that the error between the two is minimized. The determined parameter may be used for the next and subsequent processing illustrated in FIG. 3.

Accordingly, the server device 100 can calculate the travel time in the first section of the vehicle 10 based on the travel information of the vehicle 10 without using the data detected by the roadside device such as the vehicle sensor. As a result, the server device 100 can calculate the travel time in the first section of the vehicle 10 by using the travel information of the vehicle 10 that can be reliably acquired without using the data detected by the roadside device such as the vehicle sensor. Therefore, the server device 100 can perform prediction with higher accuracy than the conventional one in the prediction of the travel time.

Figure 4:
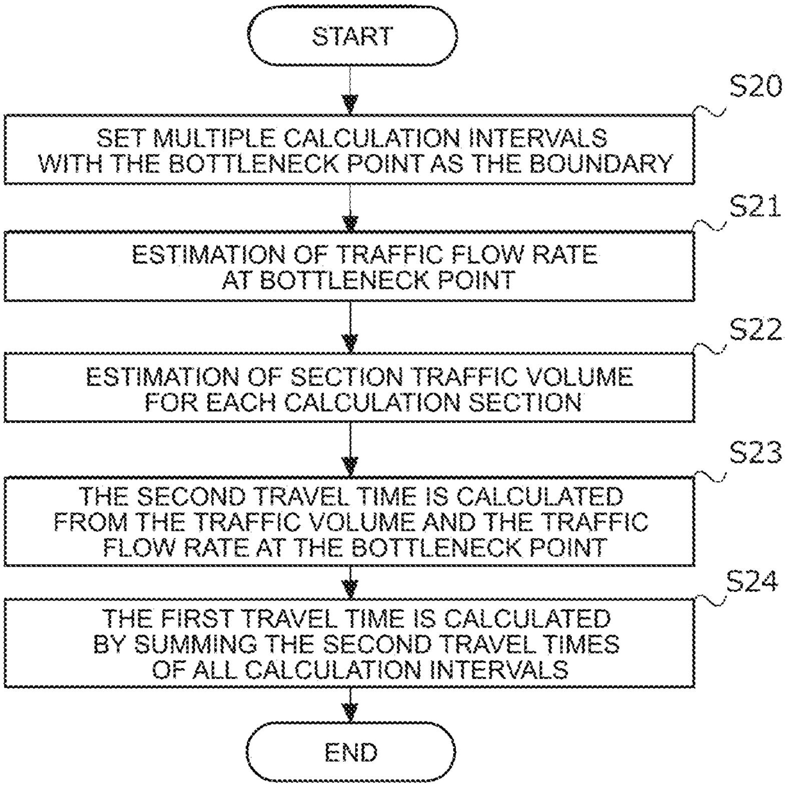
FIG. 4 is a flowchart of a process of calculating a travel time when there is a bottleneck point executed by a control unit of the server device according to the embodiment.

Next, a process performed by the server device 100 when a bottleneck point is included in the first section will be described. FIG. 4 is a flowchart of a process of calculating a travel time when there is a bottleneck point, which is executed by the control unit 110 of the server device 100 according to the embodiment. The process illustrated in FIG. 4 is executed instead of the process illustrated in FIG. 3. Among the processes described with reference to FIG. 4, the same details as those described with reference to FIG. 3 will not be described.

The server device 100 may start the processing illustrated in FIG. 4 when a trigger such as a request for providing information regarding travel time is received from a user of the vehicle 10.

First, in S20, the setting unit 112 divides the first section with the bottleneck point as a boundary, and sets a plurality of calculation sections. Here, the bottleneck point is a head point of a section in which traffic congestion is occurring. The bottleneck point may be a leading portion of a section in which the average speed of the passing vehicle 10 is equal to or less than a predetermined value. The setting unit 112 may determine the bottleneck point in which the traffic jam has occurred based on the travel information acquired from the vehicle 10. Here, the travel information acquired from the vehicle 10 may be the speed of the vehicle 10 or the braking operation frequency of the vehicle 10.

For example, the setting unit 112 analyzes a transition relationship between the braking operation frequency and the speed of the plurality of vehicles 10 at a predetermined point in the first section over a predetermined period of time. The setting unit 112 obtains a probability distribution of the transition of the speed of the vehicle 10 in the future with respect to the braking operation frequency at a certain time at a predetermined point. Then, the setting unit 112 may determine when a traffic jam occurs at a predetermined point by predicting a time at which the probability of a decrease in the traffic flow rate at the predetermined point is high from the current brake operation frequency at the predetermined point, and identify the bottleneck point.

Figure 6:
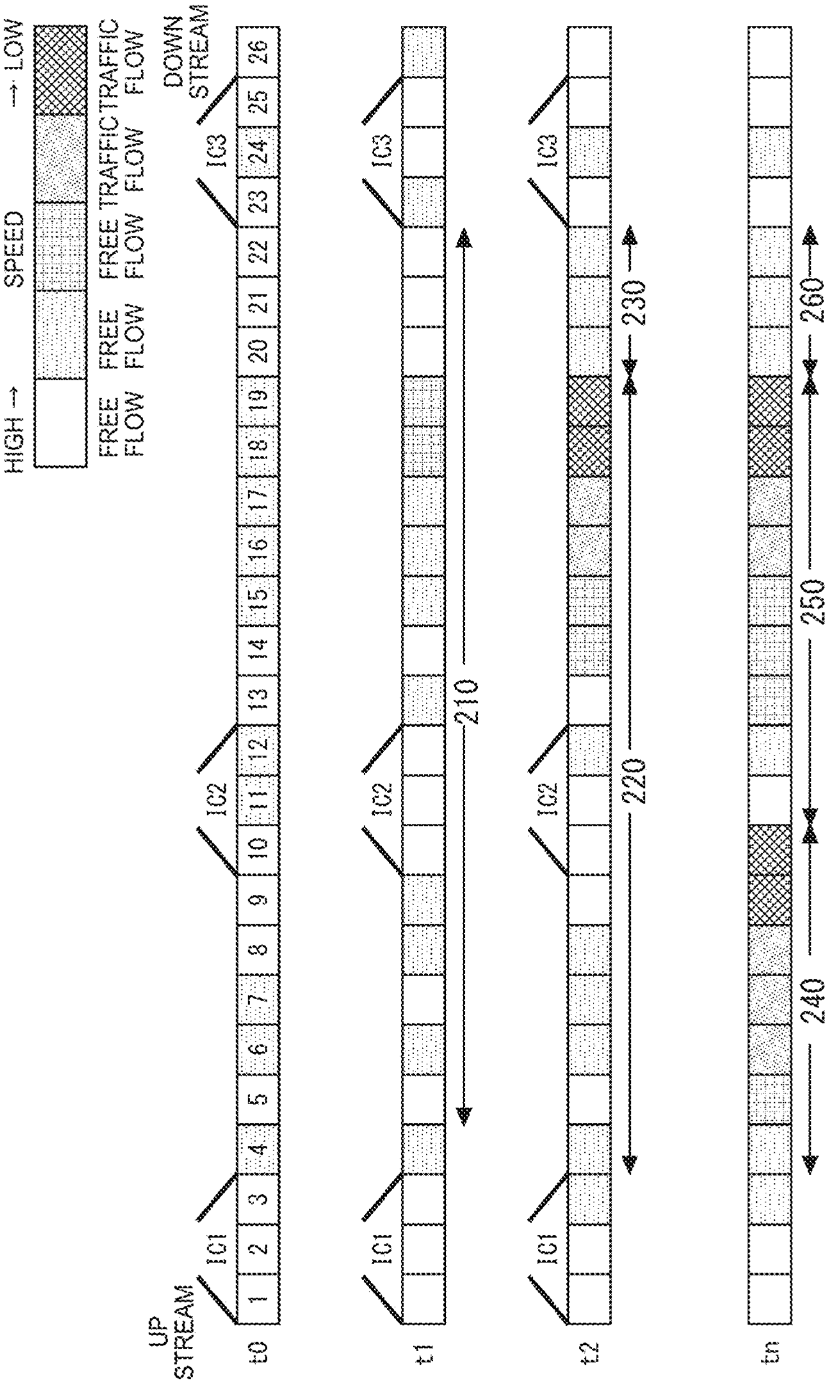
FIG. 6 is a diagram illustrating an example of setting of a calculation section.

FIG. 6 is a diagram illustrating an example of setting of a calculation section. In the time t1 in which only the free flow having the velocity of the traffic flow equal to or higher than a certain value is generated, the first section is not divided, and the calculation target section is only the section 210. On the other hand, in the time t2 where a congested flow with a velocity of the traffic flow equal to or less than a certain velocity is generated at one place, the first section is divided into two sections with the point of the congested flow (bottleneck point) as a boundary, and the section 220 and the section 230 are set as calculation sections. Similarly, in the time tn in which two congestion flows are occurring, the first section is divided into three sections with the point of the congestion flow (bottleneck point) as a boundary, and the section 240, the section 250, and the section 260 are set as calculation sections.

Next, in S21, the estimation unit 114 estimates the traffic flow rates at the respective bottleneck points. For example, the acquisition unit 111 acquires the speeds of the plurality of vehicles 10 passing through the bottleneck points. Then, the estimation unit 114 calculates an average speed from the speeds of the plurality of vehicles 10 acquired by the acquisition unit 111. Then, the estimation unit 114 estimates the traffic flow rate at each bottleneck point based on the vehicle density at the bottleneck point and the average speed of the plurality of vehicles 10 at the bottleneck point. Specifically, the estimation unit 114 may obtain the traffic flow rate at each bottleneck point by using Expression (1) and Expression (2).

The estimation unit 114 may set the traffic flow rate at each bottleneck point as a value obtained by multiplying the vehicle density at each bottleneck point by the average speed of the plurality of vehicles 10 at each bottleneck point. Note that, at the bottleneck point, the traffic amount represented by Expression (1) is treated as a traffic flow rate.

The traffic flow rate obtained by S21 may be obtained by multiplying the traffic flow rate Q calculated from Expressions (1) and (2) by the number of traffic lanes. Further, the estimation unit 114 may use a value obtained by averaging past traffic flow rate data as a traffic flow rate at a bottleneck point where traffic congestion is constantly occurring. Further, the estimation unit 114 may multiply the traffic flow rate Q calculated from Equations (1) and (2) by a value obtained by dividing a value obtained by subtracting the number of restricted lanes from the total number of lanes at the bottleneck point generated by the restriction on the road due to a construction, an accident, or the like, to obtain the traffic flow rate.

Next, in S22, the estimation unit 114 estimates, for each calculation section, the section traffic amount that is the traffic amount existing in each section. The section traffic amount may be a value obtained by multiplying the vehicle density in each calculation section by the section length of each calculation section. Further, for example, the estimation unit 114 may determine the congestion flow section and the free flow section from the information on the end of the congestion determined by the setting unit 112 based on the average speeds of the plurality of vehicles 10, and determine the number of queues in the congestion flow section as the section traffic volume in each calculation section. The section traffic volume is a specific example of the second traffic volume.

When the acquisition unit 111 can acquire the congestion length based on the traffic data from VICS (Vehicle Information and Communication System) (registered trademark) or the like, the estimation unit 114 may calculate the number of queues in the congestion flow section from the congestion length. The estimation unit 114 may use the number of queues as the section traffic volume in each calculation section.

Next, in S23, the calculation unit 113 calculates the second travel time, which is the travel time in each calculation section, from the section traffic volume and the traffic flow rate at each bottleneck point. The second travel time is a time required for the vehicle 10 to move from the end portion to the end portion of each calculation section. The calculation unit 113 acquires the section traffic volume estimated by the estimation unit 114 and the traffic flow rate at each bottleneck point, and calculates the second travel time.

Next, in S24, the calculation unit 113 calculates the first travel time by summing the second travel times of all the calculation sections. The first travel time is the travel time in the entire first section, and is the time taken for the vehicle 10 to move from the end of the first section to the opposite end.

Second Embodiment

In the first embodiment, the traffic amount in the calculation target section is estimated based on the data such as the speed transmitted from the vehicle. However, when there is an interchange or a junction in the middle of the section, the traffic amount may not be accurately determined due to the inflow and outflow of the vehicle from the branch road in the middle. Therefore, in order to more accurately grasp the traffic amount, in the second embodiment, the estimation unit 114 corrects the traffic flow rate or the like in the first section or each calculation section by using the inflow traffic amount or the outflow traffic amount from the interchange, the junction, or the like.

The acquisition unit 111 acquires an inflow traffic amount from an interchange or a junction and an outflow traffic amount from an interchange or a junction on a road including a section in which the first travel time is to be calculated. The acquisition unit 111 may inquire of an external server device to acquire an inflow traffic amount from an interchange or a junction and an outflow traffic amount from an interchange or a junction.

Then, the calculation unit 113 calculates the first travel time or the second travel time of the vehicle 10 by using the traffic amount included in the first section or each calculation section or the traffic amount existing in the section near the interchange or the junction in the vicinity of the first section (hereinafter referred to as the traffic amount near the branching section). At this time, the estimation unit 114 corrects the amount of change in the traffic amount at the point at the time when the vehicle 10 is supposed to pass through the predetermined point included in the first section. Note that the estimation unit 114 may calculate the traffic amount in the vicinity of the branching unit based on the branching rate. The branching rate is a ratio of the number of vehicles 10 that merge into the first section or diverge from the first section among the number of vehicles 10 that have passed through a predetermined interchange or junction.

Further, for example, based on information on a destination or a waypoint of the vehicle 10 on the forward path (for example, information such as a departure point, an arrival point, an entered interchange, or an exited interchange), the estimation unit 114 compares the current traffic amount on the forward path with the past traffic amount on the forward path linked to information on a similar destination or waypoint. Then, the estimation unit 114 may correct the branching rate in the return interchange or junction, assuming that the return traffic increases or decreases by the amount of the forward traffic from the past traffic. Here, for example, the forward route may be an upstream lane in a predetermined time period, and the return route may be a downstream lane in a time period after the predetermined time period.

Modified Examples

The above-described embodiment is merely an example, and the present disclosure may be appropriately modified and implemented without departing from the scope thereof.

For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device configured to calculate a travel period from a predetermined point to a target point, the information processing device comprising a control unit configured to:

estimate a traffic flow rate that is the number of vehicles passing through the target point within a predetermined unit period;

estimate a first traffic amount that is the number of vehicles in a first section based on a vehicle density that is a density of vehicles present in the first section, the first section being a section of a road from the predetermined point to the target point, and the vehicle density being calculated based on travel information including traveling speeds of the vehicles acquired from the vehicles traveling in the first section, wherein the vehicle density is calculated using an equation $$V = Vf \cdot e^{-(K/Kc)},$$

where V is an average speed of the vehicles, Vf is a maximum velocity, K is the vehicle density, and Kc is a critical density;

calculate a first travel period that is the travel period in the first section based on the traffic flow rate and the first traffic amount;

wherein the traffic flow rate is estimated using an equation Q=KV, where V is the average speed of the vehicles, K is the vehicle density, and Q is the traffic flow rate, and the control unit is configured to:

in response to a bottleneck point that is a cause of traffic congestion being present on the road, set a plurality of calculation sections by dividing the first section at the bottleneck point as a boundary;

estimate, for each of the calculation sections, a second traffic amount that is the number of vehicles present in the calculation section, the second traffic amount being estimated by multiplying the vehicle density calculated for each of the calculation sections by a section length of the calculation section;

calculate, for each of the calculation sections, a second travel period that is the travel period from a start point to an end point of each of the calculation sections, the second travel period being calculated based on the second traffic amount and the traffic flow rate at the bottleneck point; and calculate the first travel period by summing the second travel periods in all the calculation sections.

2. The information processing device according to claim 1, wherein the control unit is configured to:

acquire speeds of a plurality of vehicles at the bottleneck point as the travel information; and estimate the traffic flow rate at the bottleneck point based on the vehicle density at the bottleneck point and an average speed of the vehicles at the bottleneck point.

3. The information processing device according to claim 1, wherein the control unit is configured to:

acquire an inflow traffic amount from an interchange or a junction on the road and an outflow traffic amount from the interchange or the junction on the road; and correct the first traffic amount based on the inflow traffic amount and the outflow traffic amount.

4. An information processing device configured to calculate a travel period from a predetermined point to a target point, the information processing device comprising a control unit configured to:

estimate a traffic flow rate that is the number of vehicles passing through the target point within a predetermined unit period;

estimate a first traffic amount that is the number of vehicles in a first section based on a vehicle density that is a density of vehicles present in the first section, the first section being a section of a road from the predetermined point to the target point, and the vehicle density being calculated based on travel information including traveling speeds of the vehicles acquired from the vehicles traveling in the first section, wherein the vehicle density is calculated using an equation $$V = Vf \cdot e^{-(K/Kc)},$$

where V is an average speed of the vehicles, Vf is a maximum velocity, K is the vehicle density, and Kc is a critical density;

calculate a first travel period that is the travel period in the first section based on the traffic flow rate and the first traffic amount;

wherein the traffic flow rate is estimated using an equation Q=KV, where V is the average speed of the vehicles, K is the vehicle density, and Q is the traffic flow rate, and the control unit is configured to:

acquire speeds of a plurality of vehicles at a bottleneck point that is a cause of traffic congestion being present on the road as the travel information; and estimate the traffic flow rate at the bottleneck point based on the vehicle density at the bottleneck point and an average speed of the vehicles at the bottleneck point.

* * * * *